US010947625B2

United States Patent
Wessels et al.

(10) Patent No.: US 10,947,625 B2
(45) Date of Patent: Mar. 16, 2021

(54) CMAS-RESISTANT THERMAL BARRIER COATING AND METHOD OF MAKING A COATING THEREOF

(71) Applicant: United Technologies Corporation, Farmington, CT (US)

(72) Inventors: Kaylan M. Wessels, West Hartford, CT (US); Brian T. Hazel, Avon, CT (US); Xuan Liu, Glastonbury, CT (US); R. Wesley Jackson, West Hartford, CT (US); Elisa M. Zaleski, Manchester, CT (US)

(73) Assignee: Raytheon Technologies Corporation, Waltham, MA (US)

( * ) Notice: Subject to any disclaimer, the term of this patent is extended or adjusted under 35 U.S.C. 154(b) by 271 days.

(21) Appl. No.: 15/699,260

(22) Filed: Sep. 8, 2017

(65) Prior Publication Data
US 2019/0078215 A1 Mar. 14, 2019

(51) Int. Cl.
*C23C 4/134* (2016.01)
*C23C 28/00* (2006.01)
(Continued)

(52) U.S. Cl.
CPC .......... *C23C 28/3455* (2013.01); *C04B 35/50* (2013.01); *C23C 4/11* (2016.01); *C23C 4/134* (2016.01); *C23C 4/18* (2013.01); *C23C 28/042* (2013.01); *C23C 28/3215* (2013.01); *C23C 28/36* (2013.01); *F01D 5/288* (2013.01); *F05D 2230/312* (2013.01); *F05D 2230/90* (2013.01);
(Continued)

(58) Field of Classification Search
CPC ........................... C23C 28/3455; C23C 4/134
See application file for complete search history.

(56) References Cited

U.S. PATENT DOCUMENTS

| 5,558,922 A | 9/1996 | Gupta et al. |
| 6,703,137 B2 | 3/2004 | Subramanian |

(Continued)

FOREIGN PATENT DOCUMENTS

| EP | 1788122 A1 | 11/2006 |
| EP | 2845925 A1 | 3/2015 |

OTHER PUBLICATIONS

H. Chen, et al., "Tribological Properties of Nanostructured Zirconia Coatings Deposited by Plasma Spraying", from Wear 253 (2002), pp. 885-893.

(Continued)

*Primary Examiner* — Nathan T Leong
(74) *Attorney, Agent, or Firm* — Kinney & Lange, P.A.

(57) ABSTRACT

In one aspect, a calcium-magnesium alumino-silicate (CMAS)-resistant coating includes an outer coating having a plurality of columnar structures formed during material deposition due to preferential material accumulation and a plurality of generally vertically-oriented gaps separating adjacent columnar structures. The columnar structures include a plurality of randomly-oriented particle splats and a CMAS-reactive material and have a total porosity of less than five percent. The plurality of generally vertically-oriented gaps extend from an outermost surface of the outer coating to a first depth of the outer coating equal to or less than a total thickness of the outer coating. The vertically-oriented gaps have a median gap width of less than five micrometers.

20 Claims, 3 Drawing Sheets

(51) Int. Cl.
  C23C 28/04 (2006.01)
  F01D 5/28 (2006.01)
  C23C 4/11 (2016.01)
  C23C 4/18 (2006.01)
  C04B 35/50 (2006.01)
(52) U.S. Cl.
  CPC .... F05D 2300/15 (2013.01); F05D 2300/608 (2013.01); F05D 2300/609 (2013.01)

(56) References Cited

U.S. PATENT DOCUMENTS

| | | | |
|---|---|---|---|
| 8,192,831 | B2 | 6/2012 | Rosenzweig et al. |
| 8,389,106 | B2 | 3/2013 | Rosenzweig et al. |
| 8,586,172 | B2 | 11/2013 | Rosenzweig et al. |
| 8,658,291 | B2 | 2/2014 | Kirby et al. |
| 8,859,052 | B2 | 10/2014 | Kirby et al. |
| 9,022,743 | B2 | 5/2015 | Dierberger |
| 9,556,505 | B2 | 1/2017 | Rosenzweig et al. |
| 2006/0289405 | A1 | 12/2006 | Oberste-Berghaus et al. |
| 2009/0280298 | A1 | 11/2009 | Rosenzweig et al. |
| 2011/0003119 | A1 | 1/2011 | Doesburg et al. |
| 2015/0147524 | A1 | 5/2015 | Petorak |
| 2015/0159507 | A1* | 6/2015 | Sivaramakrishnan .. C23C 4/134 428/596 |
| 2015/0167141 | A1 | 6/2015 | Rosenzweig et al. |
| 2016/0115818 | A1 | 4/2016 | Porob et al. |
| 2016/0115819 | A1 | 4/2016 | Nayak et al. |
| 2016/0168684 | A1 | 6/2016 | Brosnan et al. |
| 2016/0347671 | A1* | 12/2016 | Strock .................. C23C 14/083 |
| 2017/0016104 | A1* | 1/2017 | Hazel ...................... F01D 11/08 |
| 2017/0101875 | A1 | 4/2017 | Rosenzweig et al. |
| 2017/0145836 | A1 | 5/2017 | Sivaramakrishnan et al. |
| 2017/0152753 | A1 | 6/2017 | Serra et al. |

OTHER PUBLICATIONS

T. Bhatia, et al., "Mechanisms of Ceramic Coating Deposition in Solution-Precursor Plasma Spray", from J. Mater. Res., vol. 17, No. 9, Sep. 2002, pp. 2363-2372.
M. Gell, et al., "Highly Durable Thermal Barrier Coatings Made by the Solution Precursor Plasma Spray Process", from Surface and Coatings Technology 177-178 (2004), pp. 97-102.
M. Gell, et al., "The Solution Precursor Plasma Spray Process for Making Durable Thermal Barrier Coatings", from Proceedings of GT2005, ASME Turbo Expo 2005, Jun. 6-9, 2005, pp. 1-7.
C. Delbos, et al., "Phenomena Involved in Suspension Plasma Spraying Part 2: Zirconia Particle Treatment and Coating Formation", from Plasma Chem Plasma Process (2006), pp. 393-414.
R. Siegert, "A Novel Process for the Liquid Feedstock Plasma Spray of Ceramic Coatings with Nanostructural Features" (2005), 191 pages.
O. Berghaus, et al., "Suspension Plasma Spraying of Nanostructured WC-12 Co Coatings", from Proceedings of the 2006 Int'l. Spray Conference 2006, 7 pages.
L. Xie, et al., "Formation of Vertical Cracks in Solution-Precursor Plasma-Sprayed Thermal Barrier Coatings", from Surface & Coatings Technology 201 (2006), pp. 1058-1064.
K. Van Every, et al., "An Investigation of the Processing Parameters for Suspension Plasma Spraying", from Materials Science & Technology 2006, Oct. 19, 2006, pp. 1-23.
C.R.C. Lima, et al., "Adhesion Improvement of Thermal Barrier Coatings with HVOF Thermally Sprayed Bond Coats", from Surface & Coatings Technology 201 (2007), pp. 4694-4701.
K. Van Every, et al., "Study of Suspension Plasma Sprayed Coatings for Thermal Barrier Applications", from 32nd Int'l. Conference on Advanced Ceramics & Composites, Daytona Beach 2008, pp. 1-29.
H. Kassner, et al., "Application of Suspension Plasma Spraying (SPS) for Manufacture of Ceramic Coatings", from Journal of Thermal Spray Technology, vol. 17(1), Mar. 2008, pp. 115-123.

K. Van Every, "Development and Evaluation of Suspension Plasma Sprayed Yttria Stabilized Zirconia Coatings as Thermal Barriers", Thesis/Dissertation Purdue University, May 2009, 205 pages.
Z. Tang, et al., "Novel Thermal Barrier Coatings Produced by Axial Suspension Plasma Spray", from Proceedings of Int'l. Thermal Spray Conference and Exposition, 2011, Hamburg Germany, 6 pages.
K Van Every, et al., "Column Formation in Suspension Plasma-Sprayed Coatings and Resultant Thermal Properties", from Journal of Thermal Spray Technology, vol. 20(4), Jun. 2011, pp. 817-828.
K. Van Every, et al., "Parametric Study of Suspension Plasma Spray Processing Parameters on Coating Microstructures Manufactured from Nanoscale yttria-Stabilized Zirconia", from Surface & Coatings Technology 206 (2012), pp. 2464-2473.
S. Mantry, et al., "Parametric Appraisal of Process Parameters for Adhesion of Plasma Sprayed Nanostructured YSZ Coatings Using Taguchi Experimental Design", from The Scientific World Journal, vol. 2013, Article ID 527491, 8 pages.
A. Ganvir, et al., "Comparative Study of Suspension Plasma Sprayed and Suspension High Velocity Oxy-Fuel Sprayed YSZ Thermal Barrier Coatings", from Surface & Coatings Technology 268 (2015) pp. 70-76.
K. Van Every, et al., "Evaluating Conditions for Manufacturing Suspension Plasma TBCs", from Int'l. Thermal Spray Conference 2015, May 11-14, 2015, pp. 1-42.
N. Curry, et al., "Performance Testing of Suspension Plasma Sprayed Thermal Barrier Coatings Produced with Varied Suspension Parameters", from Coatings 2015, 5, pp. 338-356.
Z. Tang, PhD, "Axial Suspension Plasma Spraying (ASPS) Its Development and Application", from Thermal Spray of Suspensions & Solutions Symposium (TS4), Dec. 2015, Montreal, Canada, pp. 1-33.
F. Toma, et al., "Demands, Potentials and Economic Aspects of Thermal Spraying with Aqueous Suspensions", from Thermal Spray of Suspensions & Solutions Symposium (TS4), Dec. 2-3, 2015, Montreal, Canada, 26 pages.
O. Berghaus, et al., "Suspension Plasma Spraying of Intermediate Temperature SOFC Components Using an Axial Injection DC Torch", from Materials Science Forum, 539, pp. 1332-1337.
K. Van Every, et al., "In-Flight Alloying of Nanocrystalline Yttria-Stabilized Zirconia Using Suspension Spray to Produce Ultra-Low Thermal Conductivity Thermal Barriers", from Int'l. Journal of Applied Ceramic Technology, pp. 1-24.
A. L. Vasiliev, et al., "Coatings of Metastable Ceramics Deposited by Solution-Precursor Plasma Spray: I. Binary ZrO2—Al2O3 System", from Acta Materialia 54 (2006), pp. 4913-4920.
L. Xie, et al., "Identification of Coating Deposition Mechanisms in the Solution-Precursor Plasma-Spray Process using Model Spray Experiments", from Materials Science and Eng. A362 (2003), pp. 204-212.
O. Racek, et al., "Nanostructured and Conventional YSZ Coatings Deposited using APS and TTPR Techniques", from Surface & Coatings Technology 201 (2006), pp. 338-346.
X. Ma, et al., "Solution Precursor Plasma Spray: A Promising New Technique for Forming Functional Nanostructured Films and Coatings", from 28th Int'l. Conf. on Advanced Ceramics and Composites: B, 2004, pp. 381-387.
A. Jadhav, et al., "Thick Ceramic Thermal Barrier Coatings with High Durability Deposited using Solution-Precursor Plasma Spray", from Materials Science and Eng. A405 (2005), pp. 313-320.
P. Fauchais, et al., "Understanding of Suspension DC Plasma Spraying of Finely Structured Coatings for SOFC", from IEEE Transactions on Plasma Science, vol. 33, No. 2, (Apr. 2005), pp. 920-930.
C. Delbos, et al., "Influence of Powder Size Distributions on Microstructural Features of Finely Structured Plasma Sprayed Coatings", from High Technology Plasma Processing 8 (2004), pp. 397-406.
D. Chen, et al., "Thermal Stability of Air Plasma Spray and Solution Precursor Plasma Spray Thermal Barrier Coatings", from J. Am. Ceram. Soc. 90 [10], (2007), pp. 3160-3166.

(56) References Cited

OTHER PUBLICATIONS

Z. Chen, et al., "Air-Plasma Spraying Colloidal Solutions of Nanosized Ceramic Powders", from Journal of Materials Science 39 (2004), pp. 4171-4178.
O. Berghaus, et al., "Suspension Plasma Spraying of Nano-Ceramics Using an Axial Injection Torch", from Proceedings. Thermal Spray 2005: Thermal Spray Connects: Explore its Surfacing Potential, pp. 1434-1440.
Extended European Search Report for EP Application No. 18193211.2, dated Jan. 7, 2019, 7 pages.
Communication Pursuant to Article 94(3) EPC for EP Application No. 18193211.2, dated Jun. 10, 2020, 4 pages.

* cited by examiner

CMAS-RESISTANT THERMAL BARRIER COATING AND METHOD OF MAKING A COATING THEREOF

BACKGROUND

The present invention relates generally to a thermal barrier coating (TBC) system for a component exposed to high temperatures. More particularly, the present invention relates to a calcium-magnesium alumino-silicate (CMAS)-resistant TBC system and method to produce the TBC system thereof for components of gas turbine engines (e.g., combustors and turbine blades and vanes).

TBC systems are conventionally applied to components of gas turbine engines exposed to high temperatures and/or environmental contaminants to protect and extend the life of the components. TBC systems can help inhibit oxidation, corrosion, erosion, and other environmental damage to the underlying substrate. Conventional TBC systems generally include a ceramic topcoat and a metallic bond coat. During operation, TBC systems can be susceptible to damage by environmental dust and debris, including CMAS contaminants. At elevated temperatures, CMAS can melt and infiltrate the porous TBC system, which can reduce the strain tolerance of the TBC system and promote spallation.

Suspension plasma sprayed TBCs have been developed as an alternative to TBCs deposited via electron beam-physical vapor deposition (EB-PVD). Suspension plasma spray techniques can produce coatings having columnar structures, similar to those produced by EB-PVD, which can improve strain tolerance. Unlike EB-PVD coatings, suspension plasma sprayed coatings typically have porous columns separated by large through-thickness vertically-oriented inter-columnar gaps. The columnar structures produced using suspension plasma spray can also have horizontally-oriented inter-pass porosity bands or cracks formed between material deposition passes, which can connect vertically-oriented gaps. The generally large vertically-oriented inter-columnar gaps and inter-pass porosity or cracks accommodate ingress of molten CMAS through the thickness of the ceramic top coat and into the material matrix, substantially compromising the mechanical stability of the ceramic top coat. Alternative dense, vertically cracked TBCs have been developed using suspension plasma spray. Dense, vertically cracked coatings can have a more lamellar-appearing structure similar to coatings produced with atmospheric plasma spray with through-thickness cracks formed to relieve stress. While cracks can be narrow, parallel facing surfaces extending through a full or nearly full thickness of the coating can provide a substantially straight pathway for molten CMAS infiltration.

SUMMARY

In one aspect, a calcium-magnesium alumino-silicate (CMAS)-resistant coating includes an outer coating having a plurality of columnar structures formed during material deposition due to preferential material accumulation and a plurality of generally vertically-oriented gaps separating adjacent columnar structures. The columnar structures include a plurality of randomly-oriented particle splats and a CMAS-reactive material and have a total porosity of less than five percent. The plurality of generally vertically-oriented gaps extend from an outermost surface of the outer coating to a first depth of the outer coating equal to or less than a total thickness of the outer coating. The vertically-oriented gaps have a median gap width of less than five micrometers.

In another aspect, a method of forming a calcium-magnesium alumino-silicate (CMAS)-resistant coating includes providing a suspension feedstock comprising ceramic particles composed of a CMAS-reactive material suspended in a liquid medium, depositing the ceramic particles on the substrate to form a plurality of columnar structures with a porosity of less than five percent, and forming a plurality of generally vertically-oriented gaps having a median gap width less than five micrometers and extending from an outermost surface of the coating through a first thickness of the coating.

The present summary is provided only by way of example, and not limitation. Other aspects of the present disclosure will be appreciated in view of the entirety of the present disclosure, including the entire text, claims and accompanying figures.

Figure 1:
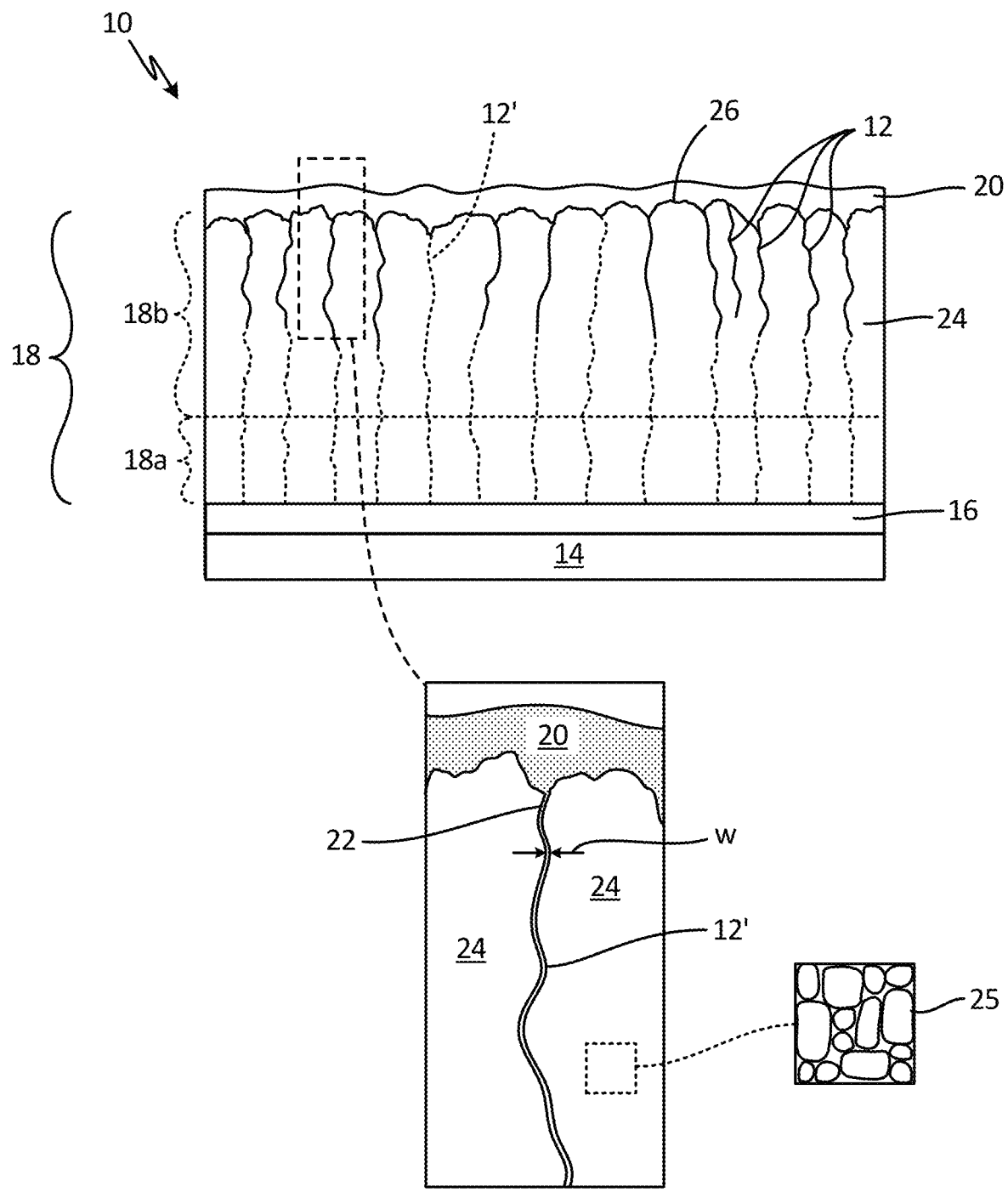
FIG. 1 is a schematic view of one embodiment of a coating.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Suspension plasma spray can be used to deposit calcium-magnesium alumino-silicate (CMAS)-resistant thermal barrier coatings (TBCs) having dense, irregularly-shaped, columnar structures separated by narrow, generally vertically-oriented gaps, which are substantially unconnected by horizontally-oriented gaps, to limit infiltration of molten CMAS. As used herein, the term "vertically-oriented gaps" refers to connected porosity bands and cracks separating columnar structures. Vertically-oriented bands of relatively high porosity can be formed during deposition due to preferential material accumulation in columns, which are typically denoted by a cauliflower-type coating surface topography, as known in the art. Cracks can be formed during deposition or post-deposition due to thermal stress and can denote a fracture in the material matrix of the coating. Cracks can form along porosity bands and between pores. As used herein, both vertically-oriented bands of connected porosity and cracks can follow the irregular shape of the columnar structures. In some embodiments, the coating can include both vertically-oriented connected porosity bands formed during material deposition and vertically-oriented cracks. In some embodiments, vertically-oriented cracks can also form within the columnar structures. As used herein, "generally vertically-oriented" refers to gaps oriented in a direction extending from an inner surface of the coating or a substrate to an outer surface of the coating. The terms "generally vertically-oriented" and "vertically-oriented" are used interchangeably herein. Vertically-oriented gaps formed during deposition are generally aligned with the spray angle, which can typically vary between 45° and 90° from the substrate. While the spray angle can be set to optimize mechanical properties of the coating, such as adhesion strength, complex component geometries can sometimes necessitate variations in spray angle across the substrate. Vertically-oriented gaps can have an alignment angle, which refers to an angle formed between the vertically-oriented gaps and the substrate. The alignment angle can substantially match the spray angle with some variation due to a variation in gas flow caused by traversing the plasma spray gun across the substrate.

Columnar structures can vary in width through the coating thickness, generally increasing in width near an outermost surface of the coating, thereby giving columns an irregular shape. Boundaries of the columnar structures can be poorly defined, as dependent on the deposition of individual particles, which can impact off-angle, forming a variety of splat shapes and orientations and producing tortuous bands of connected porosity and cracks between adjacent columnar structures. The tortuous paths can limit infiltration of contaminants, including molten CMAS, during operation.

As used herein, the term "horizontally-oriented gaps" refers to both inter-pass porosity bands and cracks. Inter-pass porosity bands can be formed during deposition and denote a boundary between layers of material deposited with each pass of the plasma spray torch. The number of material layers can vary depending on a desired coating thickness and deposition rate. Deposition rate can generally range from <1 to 25 μm/pass to produce coatings generally requiring five to greater than 50 layers. Inter-pass porosity bands can extend in a generally horizontal orientation across a coating. In some coatings, inter-pass porosity bands can undulate across the columnar structures. In other coatings, inter-pass porosity bands can be limited to a region immediately adjacent vertically-oriented gaps, extending a length less than a full width of the columnar microstructure. Inter-pass porosity bands can extend from vertically-oriented gaps, having an increased porosity in the region of the vertically-oriented gaps. In some coatings, horizontally-oriented cracks can form along inter-pass boundaries. Cracks generally denote a fracture in the material matrix of the coating and can form during deposition or post-deposition due to thermal stresses. Like inter-pass porosity bands, horizontally-oriented cracks can extend from the vertically-oriented gaps across at least a partial width of the columnar microstructure and can have a larger cross-sectional area near an intersection with the vertically-oriented gaps.

Prior suspension plasma sprayed coatings have generally included porous columnar structures having large vertically-oriented inter-columnar gaps as well as horizontally-oriented gaps, which can allow ingress of molten CMAS during operation. FIG. 1 illustrates a TBC system of the present invention. FIG. 1 provides a schematic illustration of CMAS-resistant TBC system 10 characterized by a plurality of narrow, vertically-oriented gaps 12 and 12' consisting of cracks and bands of connected porosity, respectively.

FIG. 1 illustrates CMAS-resistant TBC system 10 applied to substrate 14. CMAS-resistant TBC system 10 can include bond coat 16, ceramic top coat 18, molten CMAS 20, and precipitant 22. Substrate 14 can be a nickel- or cobalt-based superalloy, refractory alloy, or ceramic matrix composite (CMC), as commonly used in the manufacture of components for a hot section of a gas turbine engine (e.g., combustor panels and turbine blades, blade outer air seals, and stationary vanes). Bond coat 16 can protect substrate 14 from high-temperature oxidation and corrosion and improve adhesion of ceramic top coat 18. Bond coat 16 can be a diffusion or overlay bond coat comprising, for example, an aluminide or MCrAlY (where M can be iron, cobalt, or nickel) applied to substrate 14, as known in the art. In some embodiments, a surface of substrate 14 and/or bond coat 16 can be roughened, such as by grit blasting or peening, to improve adhesion of TBC ceramic top coat 18. In some embodiments, a surface roughness can be optimized to induce the desired formation of vertically-oriented gaps 12 and 12'.

Ceramic top coat 18 can be deposited on bond coat 16 using a suspension or solution precursor plasma spray technique, or combination thereof. Ceramic top coat 18 can include a plurality of columnar structures 24 separated by generally vertically-oriented gaps 12 and/or 12'. Ceramic top coat 18 can be deposited in a manner to increase material density, providing columnar structures 24 with a total porosity of less than five percent. In some embodiments, the total porosity of columnar structures 24 can be less than four percent and, in other embodiments, less than two or three percent. As discussed herein, the total porosity of columnar structures 24 excludes a porosity of vertically-oriented gaps 12 and 12'. The low porosity of columnar structures 24 can improve durability and toughness of ceramic top coat 18 and reduce ingress of contaminants such as molten CMAS. As previously discussed, columnar structures 24 are formed by the preferential accumulation of material during deposition and can include randomly-oriented particle splats 25, which can be formed as particles impact the surface at varying angles.

Ceramic top coat 18 can include a plurality of material layers (not shown) formed with each pass of the plasma spray torch across substrate 14, which combined can provide a total thickness of ceramic top coat 18. In some embodiments, the total thickness of ceramic top coat 18 can be 50-500 μm and each material layer can have an average thickness of <1 to 25 μm. Ceramic top coat 18 can include a plurality of fine, generally vertically-oriented gaps 12 and/or 12'. Vertically-oriented gaps 12 and 12' can improve strain tolerance of ceramic top coat 18 and thereby increase mechanical stability of ceramic top coat 18 when exposed to thermal cycling during operation. Spacing between adjacent vertically-oriented gaps can range from 25-500 μm. Generally, strain tolerance increases as spacing between vertically-oriented gaps is reduced. Vertically-oriented gaps 12 and 12' can extend from an outer surface 26 of ceramic top coat 18 to a depth in ceramic top coat 18 equal to a partial or full thickness of ceramic top coat 18. Vertically-oriented gaps 12, which are cracks, can be relatively shallow, extending to a depth generally around 50 percent of the total thickness and generally not exceeding 60 percent of the total thickness. Connected porosity bands 12' can continue below cracks 12 through a remaining coating thickness to improve strain tolerance through a full thickness of the coating. The amount and size of vertically-oriented gaps 12 and 12' can increase a total porosity of ceramic top coat 18. In some embodiments, ceramic top coat 18 can have a total porosity of less than ten percent with a total porosity of columnar structures 24 of less than five percent. In some embodiments, ceramic top coat 18 can have a total porosity of less than seven percent.

Ceramic top coat 18 can comprise a CMAS-reactive material, including, but not limited to a rare-earth zirconate, hafnate, or titanate that can react with molten CMAS 20, which can form on an outermost surface of ceramic top coat 18 during operation. Molten CMAS 20 can infiltrate open pores, vertically-oriented gaps 12 and 12', and horizontally-oriented gaps in columnar structures 24. Molten CMAS 20 can react with rare earth elements in columnar structures 24 to form precipitates, which can seal narrow, vertically-oriented gaps 12 and 12' thereby blocking further ingress of molten CMAS 20 into ceramic top coat 18. The tortuosity of gaps 12 and 12' can limit infiltration of contaminants, including molten CMAS, during operation. The width of vertically-oriented gaps 12 and 12', extending between adjacent material matrices 24, can be minimized to reduce ingress of contaminants including molten CMAS. Vertically-oriented gaps 12 and 12' can have a median gap width (w) less than 5 μm, and in some embodiments, less than 2 or 3 μm as measured along a length of gaps 12 and 12' between adjacent columnar structures 24. In some embodiments, vertically-oriented gaps have a total width of less than 5 μm extending for at least 25 μm near an outermost surface 26 of ceramic top coat 18 to ensure that a reaction rate between columnar structures 24 and molten CMAS 20 is faster than a rate of ingress into the vertically-oriented gaps 12 and 12'. While vertically-oriented gaps 12 and 12' can have pockets of increased width, such pockets can be limited in number and size.

As used herein, the term "rare earth" refers to elements of the lanthanide series as well as yttrium and scandium. In one embodiment, ceramic top coat 18 can comprise gadolinium zirconate (GZO), which can provide greater CMAS resistance than conventional YSZ coatings ($ZrO_2$-4 mol % $Y_2O_3$). Molten CMAS 20 can react with gadolinia ($Gd_2O_3$) to form a crystallized apatite phase, which can consume the molten CMAS and solidify. Crystalline apatite phase precipitates can form at a rate greater than the infiltration of molten CMAS 20 within vertically-oriented gaps 12 and 12' having a gap width (w) of less than 5 μm, and can thereby seal vertically-oriented gaps 12 and 12' and inhibit further infiltration of molten CMAS 20 into ceramic top coat 18. Molten CMAS 20 can fully infiltrate vertically-oriented gaps 12 and 12' of suspension plasma sprayed coatings having gap widths (w) of greater than 5 μm. As previously discussed, infiltration of molten CMAS 20 into vertically-oriented gaps 12 and 12' of ceramic top coat 18 reduces the strain tolerance and durability of ceramic top coat 18. By reducing the gap width (w), the ingress of molten CMAS 20 can be stopped before reaching a full depth of vertically-oriented gaps 12 and 12', which can limit the effect of molten CMAS 20 on ceramic top coat 18. In one embodiment, molten CMAS 20 infiltration extends into vertically-oriented gaps 12 and 12' to a depth of ceramic top coat 18 no greater than 50 percent of the total thickness of ceramic top coat 18. The use of gadolinia (and other rare earth elements) can also significantly increase the viscosity of the molten CMAS 20, which can also reduce infiltration of molten CMAS 20. Ceramic top coat 18 can comprise a rare earth content ranging from 18-100 percent (e.g., 18-100 mole percent $Gd_2O_3$-remainder $ZrO_2$) to provide sufficient reactive material to resist molten CMAS infiltration. The CMAS reactive material of the present application is not limited to gadolinia or rare earth elements. It will be understood by one of ordinary skill in the art that any material capable of reacting with CMAS to form precipitates, which can seal vertically-oriented gaps 12 and 12', is within the scope of the present invention.

In some embodiments, ceramic top coat 18 can optionally include two or more materials deposited as separate coating layers. For instance, as shown in phantom in FIG. 1, ceramic top coat 18 can have an inner section 18a, consisting of yttria-stabilized zirconia (YSZ), and outer section 18b, consisting of GZO. Multi-material coatings as shown in FIG. 1 can provide functional and/or mechanical advantages and can also reduce cost. Both coatings can be deposited in a manner to produce columnar structures 24. By reducing the width of vertically-oriented gaps 12 and 12', use of costly, but reactive, GZO can be limited to an outermost section 18b of ceramic top coat 18 adjacent outer surface 26 where molten CMAS 20 collects. In some embodiments, a thickness of outer section 18b can be 50-495 μm and a thickness of inner section 18a can be 5-100 μm. Different material deposition parameters can be used for each of the coating sections 18a and 18b to optimize the functional and mechanical properties of ceramic top coat 18. Vertically-oriented gaps 12' can extend uninterrupted through both sections 18a and 18b as shown in FIG. 1. Alternatively, each section 18a and 18b can have unique vertically-oriented gaps 12 and/or 12' or at least some vertically-oriented gaps 12 and/or 12' can be discontinuous from section 18b to section 18a. In some embodiments, columnar structures 24 of inner section 18a can be predominantly defined by vertically-oriented bands of connected porosity 12' as opposed to the vertically-oriented cracks 12 present in outer section 18b. In some embodiments, the total porosity of columnar structures 24 in outer section 18b can differ from a total porosity of columnar structures 24 in inner section 18a. Likewise, the width of vertically-oriented gaps 12 and 12' can vary. In some embodiments, the total porosity of columnar structures 24 in outer section 18b is less than the total porosity of columnar structures 24 in inner section 18a, and the average width of vertically-oriented gaps 12 and 12' is smaller for outer section 18b. In the two-part ceramic top coat 18 described herein, molten CMAS 20 infiltration can extend into vertically-oriented gaps 12 and 12' to a depth of ceramic top coat 18 no greater than a total thickness of outer section 18b. In some embodiments, molten CMAS 20 infiltration extends into vertically-oriented gaps 12 and 12' to a depth less than 50 percent of a total thickness of outer section 18b.

Horizontally-oriented gaps connecting vertically-oriented gaps 12 and 12' can increase infiltration of molten CMAS 20 into ceramic top coat 18, which can lead to failure of ceramic top coat 18. Columnar structures 24 can be substantially free of horizontally-oriented gaps that connect vertically-oriented gaps 12 and 12'. As used herein, "substantially free" means at least 90 percent of columnar structures 24 is free of generally-horizontally oriented gaps connecting vertically-oriented gaps 12 and 12'.

Figure 2:
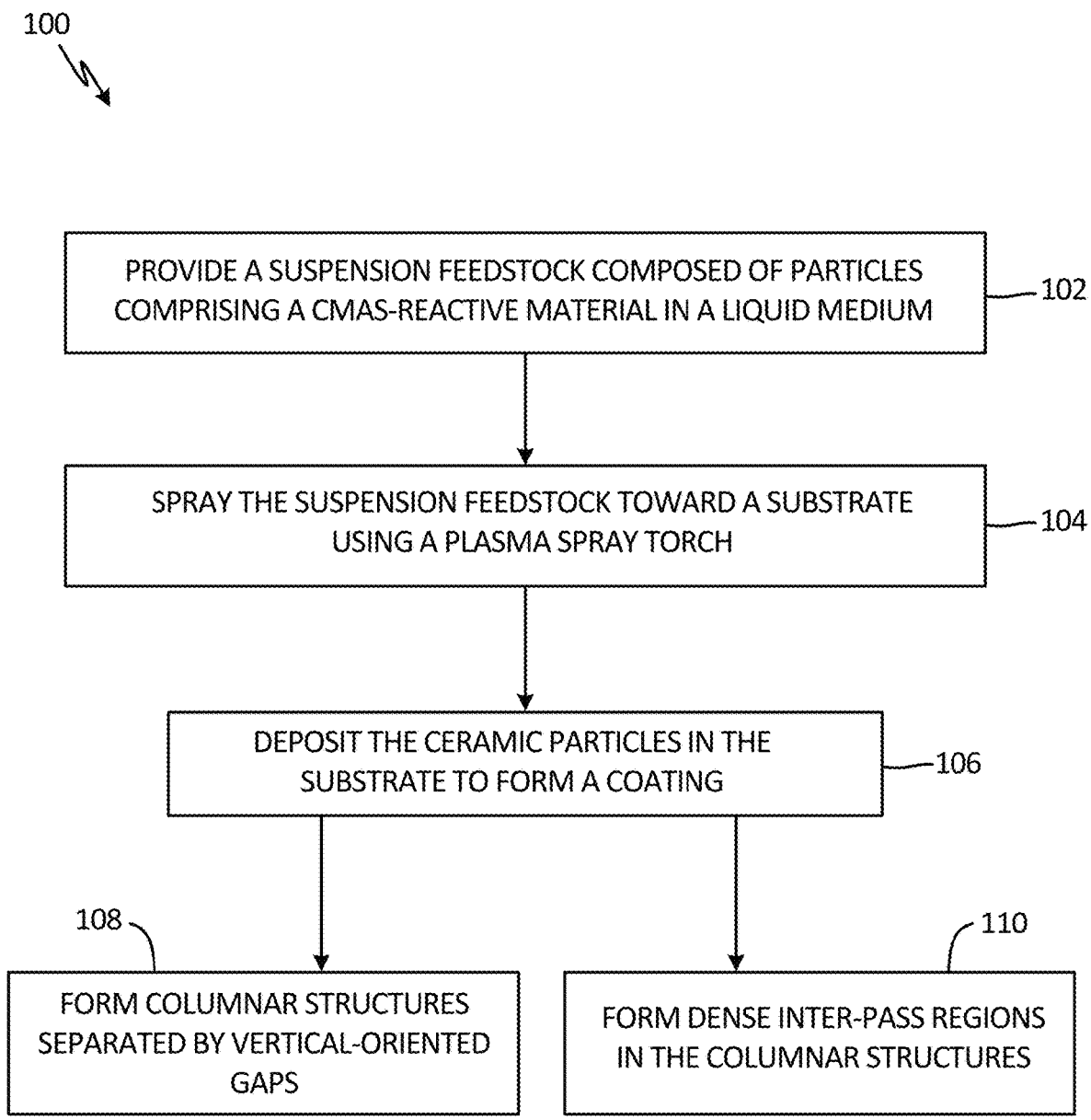
FIG. 2 is a diagram of steps for producing the coating of FIG. 1.

FIG. 2 shows a method 100 for producing the CMAS-resistant TBC systems 10 and 10'. A suspension feedstock can be provided to a plasma spray torch (step 102). The suspension feedstock can be composed of ceramic particles suspended in a liquid medium. The ceramic particles can contain a CMAS-reactive material. The suspension feedstock can be sprayed toward a surface of a substrate to be coated with a plasma spray torch (step 104). The ceramic particles can be deposited on the substrate to form a coating having narrow vertically-oriented gaps separating columnar structures and dense inter-pass regions substantially free of horizontally-oriented gaps connecting the vertically oriented gaps (steps 106, 108, and 110).

EXAMPLE

Figure 3:
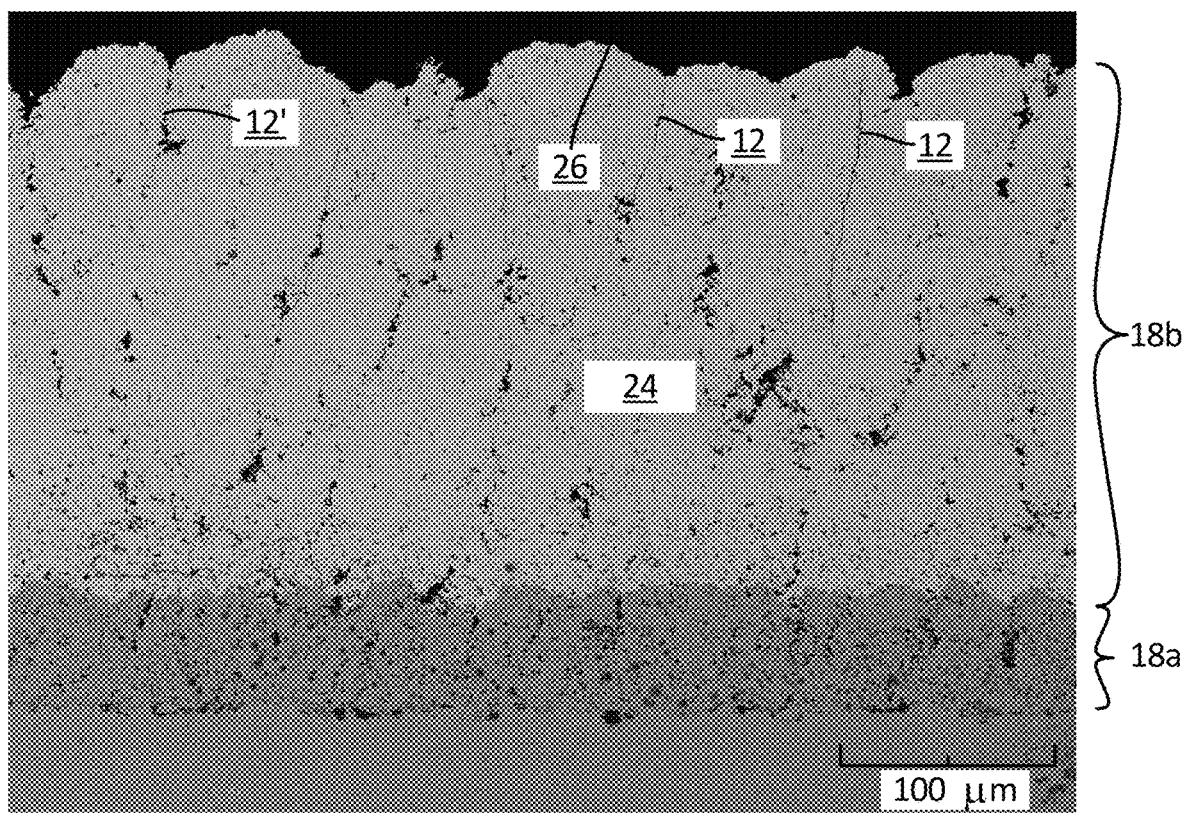
FIG. 3 is a perspective view of one embodiment of the coating.

FIG. 3 provides a perspective view of a two-part ceramic top coat 18, having an inner YSZ section 18a and outer GZO section 18b produced Alloy 718 substrate 14 using a Progressive Surface100HE™ plasma torch. The GZO section is deposited with a total torch power of 95 kW and total gas flow of 199 SLM, consisting of 85 SLM argon, 57 SLM hydrogen and 57 SLM nitrogen. The plasma torch is rastered across the substrate at a speed of 593 mm/s and at a standoff distance (distance between plasma torch nozzle and substrate) of 76.2 mm. The feedstock material is 25 wt % GZO powder (33 mol % $Gd_2O_3$-remainder $ZrO_2$) with a median particle diameter ($d_{50}$) of 1.0 µm suspended in ethanol. The suspension feed rate is maintained at 45 ml/min through each of two 230 µm diameter injectors, for a combined feed rate of 90 ml/min.

The resultant ceramic coating, evaluated with scanning electron microscopy, includes GZO section 18b having a plurality of generally vertically-oriented gaps 12 and 12' having a median gap width (w) of less than 2 µm and average spacing of approximately 100 µm. YSZ layer 18a also has vertically-oriented gaps 12' (not labeled). Ceramic top coat 18 is substantially free of horizontally-oriented gaps. The total porosity of GZO section 18b is 3.0 percent. The total porosity of columnar structures 24 (excluding YSZ layer 18a) is 2.7 percent. Porosities are determined by contrast in scanning electron microscopy at a magnification of 250×. Matrix porosity is distinguished from gap porosity by the summation of all pores with individual pore area of less than 2 µm². Porosity analysis excludes YSZ section 18a and an upper twenty-five percent thickness of GZO section 18b. Consistent with suspension plasma spray, a microstructure of columnar structures 24 is defined by randomly-oriented particle splats and particles that had at least partially melted and solidified prior to impact, both of which are visible in a micrograph.

Similar microstructures can also be produced with slightly adjusted spray parameters. In one embodiment, the total power of the plasma torch can be increased to 105 kW and total gas flow can be increased to 268 SLM, consisting of 142 SLM argon, 50 SLM hydrogen, and 76 SLM nitrogen. In all embodiments, the material feed rate can be maintained at 90 ml/min, while the injector diameter and number of injectors can be varied (generally between one and three). The median particle diameter ($d_{50}$) can be varied between 0.8 and 1.8 µm. Particles sizes within the recited range are found to increase droplet size in the plasma stream as compared to particles with a median diameter ($d_{50}$) of 0.5 µm and less. Dense vertically-cracked coatings (FIG. 1) having narrow vertically-oriented gaps of less than 5 µm can be formed using the spray parameters disclosed in the example above with an increased median particle diameter the particle ($d_{50}$) ranging from 1.8 to 2.6 µm.

Suspension plasma spray can be used to produce dense CMAS-resistant TBC systems having a CMAS-reactive ceramic top coat, columnar structures separated by narrow vertically-oriented gaps of less than 5 µm in width, and a substantial lack of horizontally-oriented gaps connecting vertically-oriented gaps. The combination of narrow vertically-oriented gaps, CMAS-reactive material matrix, and lack of horizontally-oriented gaps connecting vertically-oriented gaps can restrict and/or prevent infiltration of molten CMAS into the ceramic top coat during operation.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A calcium-magnesium alumino-silicate (CMAS)-resistant coating includes an outer coating having a plurality of columnar structures formed during material deposition due to preferential material accumulation and a plurality of generally vertically-oriented gaps separating adjacent columnar structures. The columnar structures include a plurality of randomly-oriented particle splats and a CMAS-reactive material and have a total porosity of less than five percent. The plurality of generally vertically-oriented gaps extend from an outermost surface of the outer coating to a first depth of the outer coating equal to or less than a total thickness of the outer coating. The vertically-oriented gaps have a median gap width of less than five micrometers.

The CMAS-resistant coating of the preceding paragraph can optionally include, additionally and/or alternatively, any one or more of the following features, configurations and/or additional components:

The CMAS-resistant coating system of the preceding paragraph, wherein the median gap width of the plurality of vertically-oriented gaps is less than three micrometers.

The CMAS-resistant coating system of any of the preceding paragraphs, wherein the CMAS-reactive material comprises a rare earth element content ranging from 18 to 100 mole percent.

The CMAS-resistant coating system of any of the preceding paragraphs, wherein the CMAS-reactive material comprises gadolinia.

The CMAS-resistant coating system of any of the preceding paragraphs, wherein the columnar structures have a total porosity of less than three percent.

The CMAS-resistant coating system of any of the preceding paragraphs, wherein the outer coating has a total porosity of less than ten percent.

The CMAS-resistant coating system of any of the preceding paragraphs, wherein the outer coating has a total porosity of less than five percent.

The CMAS-resistant coating system of any of the preceding paragraphs, wherein an average distance between each of the plurality of vertically-oriented gaps ranges from 25-500 micrometers.

The CMAS-resistant coating system of any of the preceding paragraphs, wherein the plurality of vertically-oriented gaps are bands of connected porosity separating adjacent columnar structures.

The CMAS-resistant coating system of any of the preceding paragraphs, wherein the plurality of vertically-oriented gaps are cracks.

The CMAS-resistant coating system of any of the preceding paragraphs, wherein the cracks extend from the outermost surface of the coating to a depth less than 60 percent of the outer coating thickness.

The CMAS-resistant coating system of any of the preceding paragraphs, wherein an outermost portion of the plurality of vertically-oriented gaps is filled with a crystallization product of CMAS and the CMAS-reactive material, and wherein the plurality of vertically-oriented gaps are filled from the outermost surface of the outer coating to a second depth of the outer coating, the second depth being less than the first depth.

The CMAS-resistant coating system of any of the preceding paragraphs, wherein the second depth is less than half of the total thickness of the outer coating.

The CMAS-resistant coating system of any of the preceding paragraphs, wherein at least 90 percent of the outer coating is free of generally horizontally-oriented gaps connecting adjacent vertically-oriented gaps.

The CMAS-resistant coating system of any of the preceding paragraphs and further including an inner coating having a plurality of columnar structures and a material having a different chemical composition than the material of the outer coating.

A method of forming a calcium-magnesium aluminosilicate (CMAS)-resistant coating includes providing a suspension feedstock comprising ceramic particles composed of a CMAS-reactive material suspended in a liquid medium, depositing the ceramic particles on the substrate to form a plurality of columnar structures with a porosity of less than five percent, and forming a plurality of generally vertically-oriented gaps having a median gap width less than five micrometers and extending from an outermost surface of the coating through a first thickness of the coating.

The method of the preceding paragraph can optionally include, additionally and/or alternatively, any one or more of the following features, configurations and/or additional components.

The method of the preceding paragraph, wherein the CMAS-reactive material comprises a rare earth element.

The method of any of the preceding paragraphs, wherein the CMAS-reactive material comprises gadolinia.

The method of any of the preceding paragraphs, wherein spraying the suspension feedstock includes making multiple spray passes across the substrate to increase a total thickness of the coating in a layer-by-layer fashion, and forming dense inter-pass regions of the coating such that at least 90 percent of the coating by volume is free of generally horizontally-oriented gaps connecting adjacent vertically-oriented gaps in the coating.

The method of any of the preceding paragraphs, sealing a portion of the vertically-oriented gaps from ingress of molten CMAS, wherein sealing includes filling a portion of the plurality of vertically-oriented gaps with a crystallization product of CMAS and the CMAS-reactive material. The portion filled extends from an outermost surface of the coating.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A calcium-magnesium alumino-silicate (CMAS)-resistant coating system comprising:
    an outer coating comprising:
        a plurality of columnar structures denoted by a cauliflower-type surface topography and having a total porosity of less than five percent, wherein the columnar structures comprise:
            a plurality of randomly-oriented particle splats; and
            a CMAS-reactive material; and
        a plurality of generally connected porosity bands forming vertically-oriented gaps extending from an outermost surface of the outer coating to a first depth of the outer coating equal to or less than a total thickness of the outer coating, wherein the connected porosity bands separate adjacent columnar structures by a median gap width less than five micrometers and wherein the connected porosity bands have a porosity less than 100 percent.

2. The CMAS-resistant coating system of claim 1, wherein the median gap width of the plurality of vertically-oriented gaps is less than three micrometers.

3. The CMAS-resistant coating system of claim 1, wherein the CMAS-reactive material comprises a rare earth element content ranging from 18 to 100 mole percent.

4. The CMAS-resistant coating system of claim 1, wherein the CMAS-reactive material comprises gadolinia.

5. The CMAS-resistant coating system of claim 1, wherein the columnar structures have a total porosity of less than three percent.

6. The CMAS-resistant coating system of claim 1, wherein the outer coating has a total porosity of less than ten percent.

7. The CMAS-resistant coating system of claim 1, wherein the outer coating has a total porosity of less than five percent.

8. The CMAS-resistant coating system of claim 1, wherein an average distance between each of the plurality of vertically-oriented gaps ranges from 25-500 micrometers.

9. The CMAS-resistant coating system of claim 1, wherein the plurality of vertically-oriented gaps are bands of connected porosity separating adjacent columnar structures.

10. The CMAS-resistant coating system of claim 9, wherein the cracks extend from the outermost surface of the coating to a depth less than 60 percent of the outer coating thickness.

11. The CMAS-resistant coating system of claim 1, and further comprising a plurality of vertically-oriented cracks.

12. The CMAS-resistant coating system of claim 1, wherein an outermost portion of the plurality of vertically-oriented gaps is filled with a crystallization product of CMAS and the CMAS-reactive material, and wherein the plurality of vertically-oriented gaps are filled from the outermost surface of the outer coating to a second depth of the outer coating, wherein the second depth is less than the first depth.

13. The CMAS-resistant coating system of claim 12, wherein the second depth is less than half of the total thickness of the outer coating.

14. The CMAS-resistant coating system of claim 1, wherein at least 90 percent of the outer coating is free of generally horizontally-oriented gaps connecting adjacent vertically-oriented gaps.

15. The CMAS-resistant coating system of claim 1 and further comprising:
an inner coating comprising:
a plurality of columnar structures and
a material having a different chemical composition than the material of the outer coating.

16. A method of forming a calcium-magnesium aluminosilicate (CMAS)-resistant coating comprising:
providing a suspension feedstock comprising ceramic particles suspended in a liquid medium, wherein the ceramic particles comprises a CMAS-reactive material;
depositing the ceramic particles on the substrate to form an outer coating comprising a plurality of columnar structures having a total porosity of less than five percent, wherein the columnar structures are formed during material deposition and are denoted by a cauliflower-type surface topography and, wherein the columnar structures comprise:
a plurality of randomly-oriented particle splats; and
a CMAS-reactive material;
forming a plurality of generally connected porosity bands forming vertically-oriented gaps extending from an outermost surface of the outer coating to a first depth of the outer coating equal to or less than a total thickness of the outer coating, wherein the connected porosity bands are formed during material deposition and separate adjacent columnar structures by a median gap width of less than five micrometers and wherein the connected porosity bands have a porosity less than 100 percent.

17. The method of claim 16, wherein the CMAS-reactive material comprises a rare earth element.

18. The method of claim 17, wherein the CMAS-reactive material comprises gadolinia.

19. The method of claim 16, wherein spraying the suspension feedstock comprises:
making multiple spray passes across the substrate to increase a total thickness of the coating in a layer-by-layer fashion; and
forming dense inter-pass regions of the coating such that at least 90 percent of the coating by volume is free of generally horizontally-oriented gaps connecting adjacent vertically-oriented gaps in the coating.

20. The method of claim 16, and further comprising:
sealing a portion of the vertically-oriented gaps from ingress of molten CMAS, wherein sealing comprises filling a portion of the plurality of vertically-oriented gaps with a crystallization product of CMAS and the CMAS-reactive material, wherein the portion filled extends from an outermost surface of the coating.

* * * * *